(12) United States Patent
Fujimoto (10) Patent No.: US 8,561,309 B2
(45) Date of Patent: Oct. 22, 2013

(54) SHAPE MEASURING DEVICE

(75) Inventor: Akihiro Fujimoto, Hino (JP)

(73) Assignee: Konica Minolta Opto, Inc., Tokyo (JP)

( * ) Notice: Subject to any disclaimer, the term of this patent is extended or adjusted under 35 U.S.C. 154(b) by 164 days.

(21) Appl. No.: 13/258,255

(22) PCT Filed: Feb. 15, 2010

(86) PCT No.: PCT/JP2010/052162
§ 371 (c)(1),
(2), (4) Date: Sep. 21, 2011

(87) PCT Pub. No.: WO2010/109975
PCT Pub. Date: Sep. 30, 2010

(65) Prior Publication Data
US 2012/0017455 A1  Jan. 26, 2012

(30) Foreign Application Priority Data
Mar. 24, 2009 (JP) ................. 2009-071420

(51) Int. Cl.
*G01B 5/008* (2006.01)
(52) U.S. Cl.
USPC ................................ 33/503; 33/556
(58) Field of Classification Search
USPC ................................... 33/503, 556
See application file for complete search history.

(56) References Cited

U.S. PATENT DOCUMENTS

| | | | | |
|---|---|---|---|---|
| 5,074,052 A | * | 12/1991 | McMurtry | 33/559 |
| 7,055,367 B2 | * | 6/2006 | Hajdukiewicz et al. | 33/503 |
| 7,918,033 B2 | * | 4/2011 | Held | 33/503 |
| 2007/0271803 A1 | * | 11/2007 | Ishikawa | 33/503 |
| 2009/0307915 A1 | * | 12/2009 | Sutherland | 33/502 |
| 2012/0017453 A1 | * | 1/2012 | Ogihara et al. | 33/503 |
| 2012/0246953 A1 | * | 10/2012 | Engel | 33/503 |
| 2013/0050701 A1 | * | 2/2013 | Jensen et al. | 33/503 |

FOREIGN PATENT DOCUMENTS

| | | |
|---|---|---|
| JP | 2001-280947 | 10/2001 |
| JP | 2002-357415 | 12/2002 |
| JP | 2006-125934 | 5/2006 |

OTHER PUBLICATIONS

English-language International Search Report from the Japanese Patent Office mailed May 18, 2010, for International Application No. PCT/JP2010/052162.

* cited by examiner

*Primary Examiner* — G. Bradley Bennett
(74) *Attorney, Agent, or Firm* — Finnegan, Henderson, Farabow, Garrett & Dunner, L.L.P.

(57) ABSTRACT

A shape measuring device to measure a shape of a workpiece, wherein the shape measuring device includes:
the probe;
a probe support shaft to pivotally support the probe; and
a probe drive device to which the probe support shaft is attached to contact the probe with a measuring position of the workpiece and to move relatively the workpiece and the probe;
wherein the probe is a sphere pivotally supported by the probe support shaft and has a cut face which is a shape cut so as to be nearly vertical to the probe support shaft and
a shape measurement of a workpiece surface is carried out in such a manner that the cut face of the probe is faced with a face intersecting a face containing the measuring position of the workpiece surface, and a surface of the sphere is contacted with the measuring position of the workpiece.

6 Claims, 6 Drawing Sheets

PRIOR ART

FIG. 10b

PRIOR ART

FIG. 10c

PRIOR ART

FIG. 10d

PRIOR ART

FIG. 11

PRIOR ART

SHAPE MEASURING DEVICE

CROSS REFERENCE TO RELATED APPLICATIONS

This application is a national phase application under 35 U.S.C. 371 based on International Application No. PCT/JP2010/052162, filed Feb. 15, 2010, which claims the priority of Japanese Patent Application No. 2009-071420, filed Mar. 24, 2009, the entire content of both of which is hereby incorporated by reference.

TECHNICAL FIELD

The present invention relates to a shape measuring device to measure the surface shape of a workpiece based on the moving amount of a probe by allowing the probe to make contact with the surface of the workpiece or to move while in contact therewith.

BACKGROUND

Figure 10A:
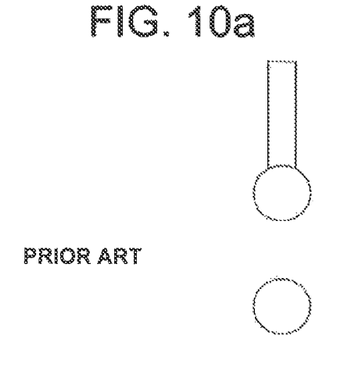
FIG. 10a shows the shapes of probes as conventional examples.
Figure 10B:
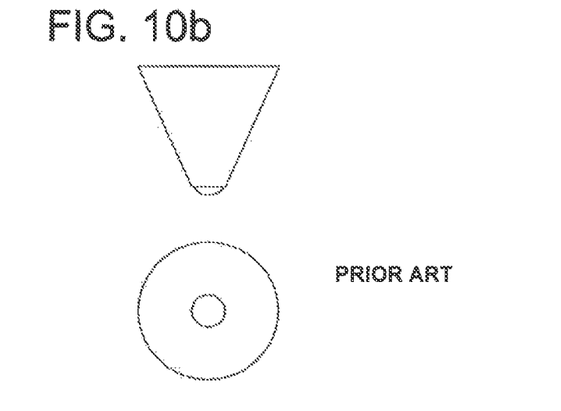
FIG. 10b shows the shapes of probes as conventional examples.
Figure 10C:
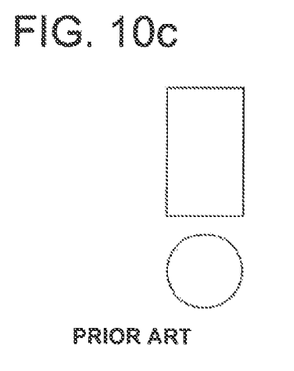
FIG. 10c shows the shapes of probes as conventional examples.
Figure 10D:
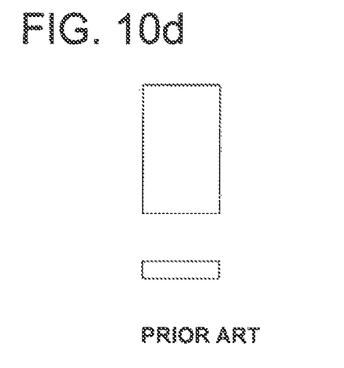
FIG. 10d shows the shapes of probes as conventional examples.

In a contact-type measuring method to measure the contour shape or the surface roughness of a workpiece by allowing a probe to make contact with the workpiece, for example, shapes as shown in FIGS. 10A-10D as the tip shape of a probe are known. Of these, with respect to further highly precise measurement in submicron dimensions or less, the tip shape of a probe is basically a spherical shape as shown in FIG. 10A or FIG. 10B so as to prevent an error caused by the tip shape as much as possible. Especially, the shape as shown in FIG. 10A can be highly precisely produced with ease, being most precise in the contact-type measuring method in submicron dimensions or less, resulting in a mainstream shape.

As the contact-type measuring method, a method is known in which a probe as described above is brought into contact with a workpiece and then the point contact position with the workpiece is extracted based on data calculated by offsetting a known probe shape portion from the central coordinate of the probe possessed by the measuring device to capture a shape. When the tip is spherical, extraction is carried out using data calculated by offsetting a known R from the tip spherical center of the probe.

For example, Patent Documents 1 and 2 describe techniques with respect to shape measurement using a spherical stylus, and Patent Document 3 describes a technique for shape measurement using a probe having a spherical face as the tip face shape and a taper face formed so as to smoothly lead to the spherical face in the outer circumference thereof.

PRIOR ART DOCUMENTS

Patent Documents

Patent Document 1: Unexamined Japanese Patent Application Publication No. 2002-357415
Patent Document 2: Unexamined Japanese Patent Application Publication No. 2001-280947
Patent Document 3: Unexamined Japanese Patent Application Publication No. 2006-125934

BRIEF DESCRIPTION OF THE INVENTION

Problems to be Solved by the Invention

Figure 11:
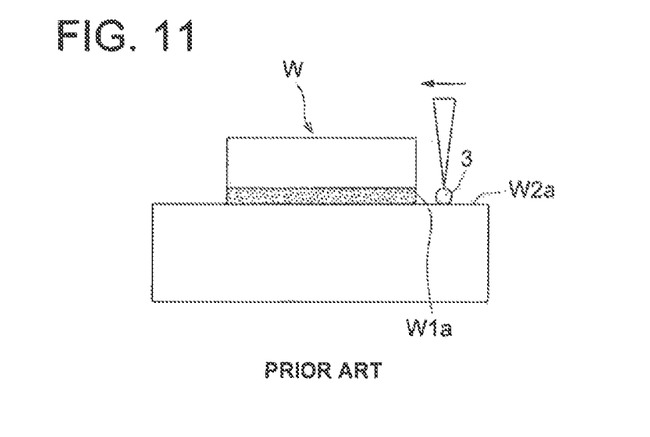
FIG. 11 is a view showing the shape measuring state of the surface of a workpiece in a conventional example.

However, over recent years, there is a trend in which the need to measure a fine and complex shape highly accurately is increasing. For example, as shown in FIG. 11, the number of workpieces W having a face W2a intersecting an outer circumferential face W1a in the vicinity of the outer circumferential face W1a, which is an outer shape measuring region of a height of several tens of micrometers, is increasing. When the outer circumferential face W1a of such a workpiece W is measured, a state results as shown in FIG. 11. Therefore, to prevent physical interference with the face W2a, the R of the tip sphere of a probe 3 has to be reduced to a level of several tens of micrometers. Reducing the size of the tip sphere in such a manner causes 3 adverse effects as shown below.

Initially, reduction of the size of the tip sphere results in difficult production. It is difficult to produce specifically a sphere having a diameter of several tens of micrometers as a true sphere with high precision of a level of nanometers.

Secondly, the attachment area of a support bar and a sphere becomes extremely small, and thereby the bonding power between the sphere and the support bar becomes weak. Thereby, even with a measuring pressure of several milligrams, the sphere is easily disengaged from the support bar, resulting in difficult handling.

Thirdly, a support bar nearly equal to or smaller than the sphere in size is employed and thereby the diameter of the support bar itself becomes several tens of micrometers. In this case, the support bar bends in the pressing direction and then some error between contact data calculated and actual data occurs, whereby highly precise measurement cannot be carried out.

From the viewpoint of the above problems, it has been difficult to measure a highly precise workpiece via the conventional method.

In view of the above circumstances, the present invention was completed. An object thereof is to provide a shape measuring method in which in the case where a face intersecting a face containing the measuring position of a workpiece exists, with no interference with the face, highly precise measurement can be carried out; the sphere of a probe needs not to be small; a highly precise true sphere can be produced; the bonding power between the probe and the support shaft is strengthened; and further the probe support shaft can be prevented from bending.

Means to Solve the Problems

According to an embodiment of the present invention, there is provided a shape measuring device to measure a surface shape of a workpiece based on a moving amount of a probe by contacting or moving while in contact the probe with a surface of the workpiece, wherein the shape measuring device includes:

the probe; a probe support shaft to pivotally support the probe; and a probe drive device to which the probe support shaft is attached to contact the probe with a measuring position of the surface of the workpiece and to move relatively the workpiece and the probe; wherein the probe is a sphere pivotally supported by the probe support shaft and has a cut face which is a shape cut so as to be nearly vertical to the probe support shaft in the sphere; and a shape measurement of the surface of the workpiece is carried out in such a manner that the cut face of the probe is faced with a face intersecting a face containing the measuring position of the surface of the workpiece, and a surface of the sphere is contacted with the measuring position of the workpiece.

Effects of the Invention

Even in the case where there is a face intersecting a face containing a measuring position of a workpiece, the present invention makes it possible to carry out highly precise measurement with no interference of a probe with the face. Further, the sphere of a probe needs not to be small; a highly precise true sphere can be produced; the bonding power between the probe and the probe support shaft can be strengthened; and the probe support shaft can be prevented from bending.

BRIEF DESCRIPTION OF THE DRAWINGS

FIG. 1a is a plan view of a workpiece and FIG. 1b is a side view of the workpiece;

PREFERRED EMBODIMENTS OF THE INVENTION

With reference to the drawings, the preferred embodiments of the present invention will now be described.

First Embodiment

Figure 1A:
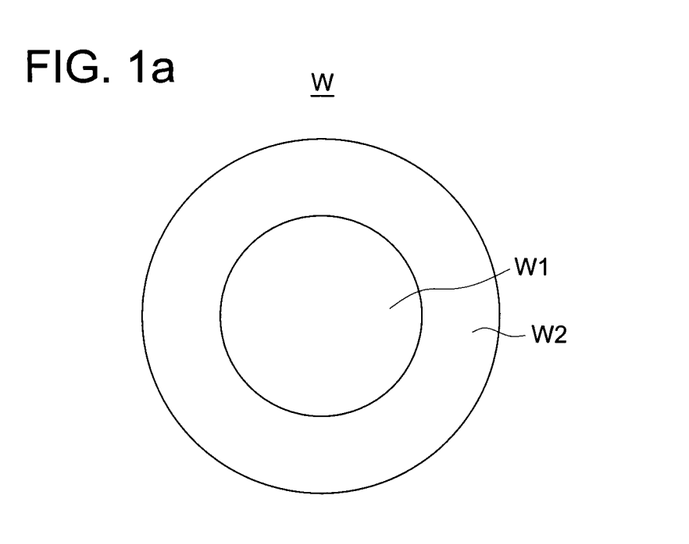
FIG. 1a is a plan view of one example of a workpiece used in a first embodiment of the present invention.
Figure 1B:
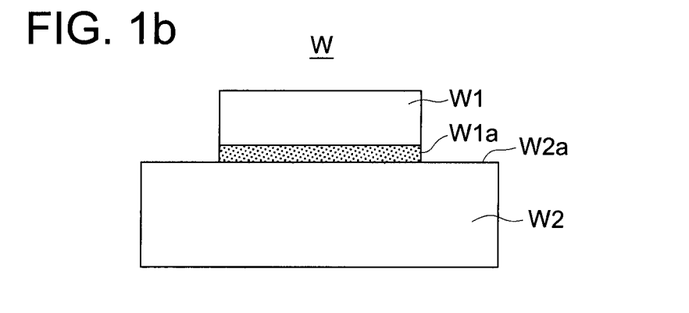
FIG. 1b is a side view of one example of a workpiece used in a first embodiment of the present invention.

In the present invention, the shape of the outer circumferential face W1a of a workpiece W as shown in FIG. 1 can be preferably measured. Specifically, a workpiece W is formed by layering 2 cylinders W1 and W2 differing in size. In such a workpiece W, in the outer circumferential face of the cylinder W1 of the top side, an outer circumferential face W1a adjacent to the upper face W2a of the cylinder W2 of the bottom side can be preferably measured. Herein, the upper face W2a of the cylinder W2 is a face intersecting the outer circumferential face W1a of the cylinder W1

Figure 2:
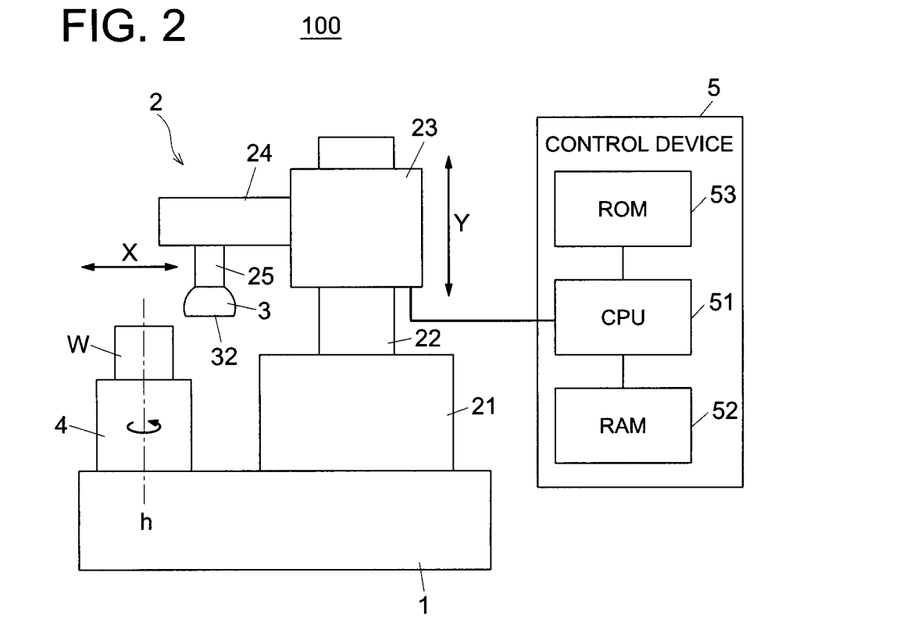
FIG. 2 is a conceptual view showing a schematic constitution of a shape measuring device in the first embodiment of the present invention.

As shown in FIG. 2, the shape measuring device 100 is provided with a probe 3, a probe support shaft 25 to pivotally support the probe 3, and a probe drive device 2, to which the probe support shaft 25 is attached, to allow the probe 3 to make contact with the measuring position of the outer circumferential face W1a of a workpiece W and to move relatively the workpiece W and the probe 3.

The probe drive device 2 is provided with a base platform 1, a base 21 fixed on the base platform 1, a Y axis guide 22 fixed to the base 21 extending in the Y direction, a Y stage 23 supported by the Y axis guide 22 moving in the Y direction (the Y direction vertical to the X direction), an X stage 24 provided for the Y stage 23 to hold a probe 3 and to allow the probe 3 to move in the X direction, a rotary stage 4 provided on the base platform 1 to rotatably support a workpiece W, and a control device 5 to control the operation of the Y stage 23, the X stage 24, and the rotary stage 4.

A probe support shaft 25 extending downward is attached to the X stage 24 and a probe 3 is attached to the tip of the probe support shaft 25.

Figure 4:
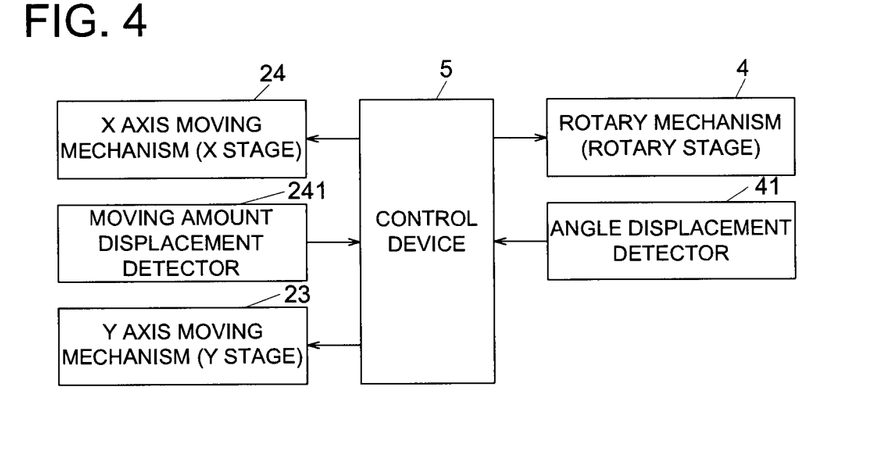
FIG. 4 is a block diagram showing a schematic control constitution used in the first embodiment of the present invention.

As shown in FIG. 4, the X stage 24 has a moving amount displacement detector 241 to detect the moving amount of the X stage 24 in the X direction. The moving amount displacement detector 241 is connected to the control device 5 to output a moving amount having been detected by the moving amount displacement detector 241 to the control device 5.

Figure 3:
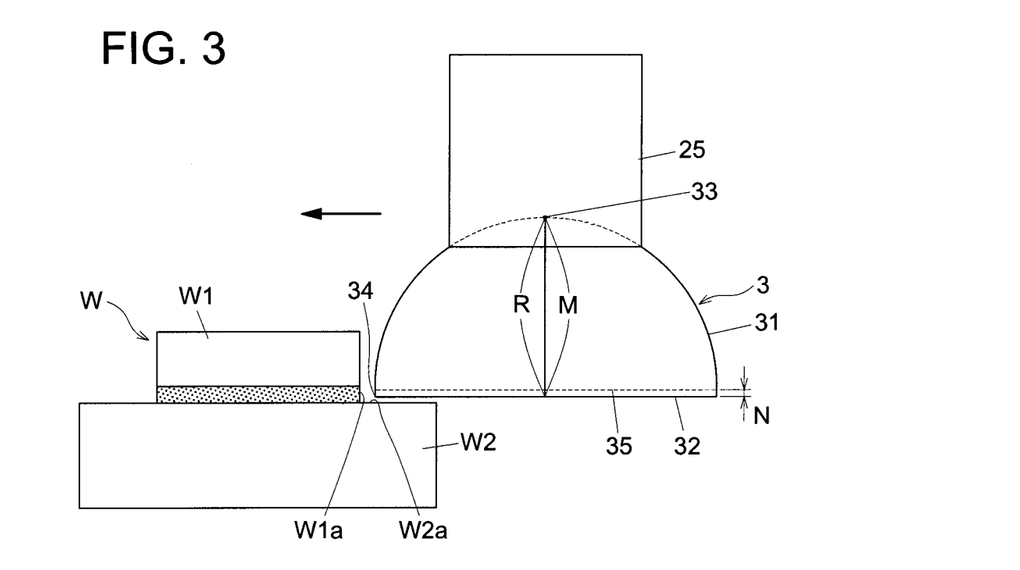
FIG. 3 is a view showing a shape measuring state of the surface of a workpiece in the first embodiment of the present invention.

As shown in FIG. 3, the probe 3 is a sphere 31 pivotally supported by the probe support shaft 25 and has a cur face which is a shape cut so as to be nearly vertical to the probe support shaft 25 in the sphere 31.

The cut face 32 of the probe 3 is constituted in such a manner that distance M of the vertical direction between the cut face 32 and the top 33 of the sphere 31 opposed thereto across the equatorial plane 35 of the sphere 31 is at least radius R, and of the surface of the sphere 31, the equatorial position 34 of the sphere 31 is allowed to make contact with the measuring position of the outer circumferential face W1a of a workpiece W.

Figure 5A:
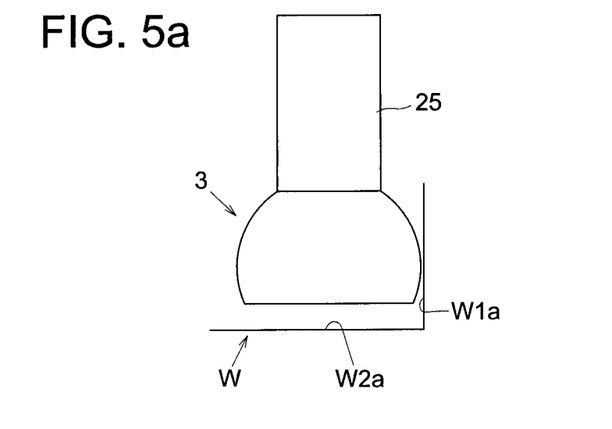
FIG. 5a contains views to illustrate the placement state of a probe and a probe support shaft in the first embodiment of the present invention.
Figure 5B:
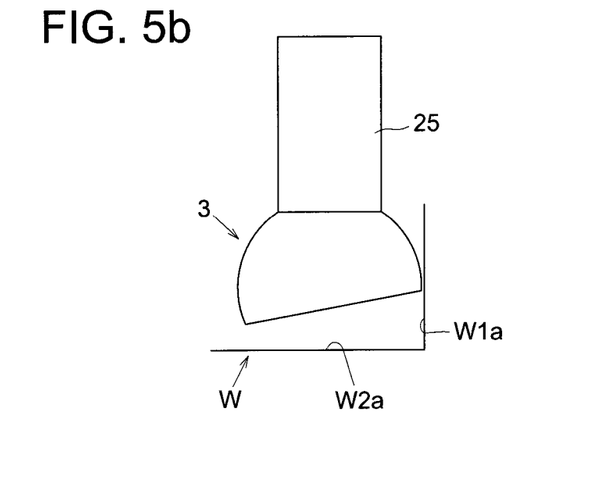
FIG. 5b contains views to illustrate the placement state of a probe and a probe support shaft in the first embodiment of the present invention.

Further, distance N of the direction nearly vertical to the cut face 32 between the contact position (equatorial position 34) and the cut face 32 is preferably 10 μm-60 μm. When distance N is 10 μm-60 μm, even in the case where, for example, as shown in FIG. 5B, a probe 5 has some placement shift with respect to the probe support shaft 25, the placement shift can be absorbed by distance N. Incidentally, FIG. 5A shows an ideal state in placement of the probe 3 and the probe support shaft 25. Herein, when distance N is allowed to be less than 10 μm, the above placement shift cannot be absorbed. In the case of more than 60 μm, the cut face 32 is brought into contact with a face (the upper face W2a of the cylinder W2) intersecting a face (the outer circumferential face W1a) containing the measuring position, whereby interference may occur.

The shape measurement of the outer circumferential face W1a of a workpiece W is carried out while the cut face 32 of a probe 3 is allowed to face a face (the upper face W2a of the cylinder W2a) intersecting a face containing the measuring position of the outer circumferential face W1a of a workpiece W and also the equatorial position 34 of the sphere 31 is pressed to and brought into contact with the measuring position of the workpiece W.

The rotary stage 4 rotates around the rotation axis h passing nearly through the center of a workpiece W (refer to FIG. 2), having, as shown in FIG. 4, an angle displacement detector 41 to detect the angle moving amount of the rotary stage 4. The angle displacement detector 41 connects to the control device 5 and outputs a moving amount having been detected by the angle displacement detector 41 to the control device 5.

On the rotary stage 4, a workpiece W to be measured is placed.

As shown in FIG. 4, the control device 5 is connected to the X stage 24, the Y stage 23, the rotary stage 4, the moving amount displacement detector 241, and the angle displacement detector 41. The control device 5 is provided with a CPU (Central Processing Unit) 51, a RAM (Random Access Memory) 52, and a ROM (Read Only Memory) 53 (refer to FIG. 2) to control the operation of the X stage 24, the Y stage 23, and the rotary stage 4. In the control device 5, a program specified from various kinds of programs stored in the ROM 53 is developed on the RAM 52. Then, the thus-developed program cooperates with the CPU 51 to carry out various processings.

Next, a method to measure the shape of the outer circumferential face W1a of a workpiece W using the shape measuring device 100 will be described.

Initially, the cut face 32 of a probe 3 is allowed to face with a face (the upper face W2a of the cylinder W2a) intersecting a face containing the measuring position of the outer circumferential face W1a of a workpiece W, and also in order for the equatorial position 34 of the probe 3 to make contact with the measuring position of the outer circumferential face W1a of the workpiece W, the Y stage 23 and the X stage 24 are moved. At this moment, the X stage 24 is controlled so that the probe 3 has constant pressing power to the workpiece W.

Then, the rotary stage is allowed to rotate at least one revolution and at a predetermined interval, the angle displacement amount of the rotary stage 4 and the movement displacement amount of the X stage 24 are synchronized. Then, the angle displacement amount and the movement displacement amount of the X stage 24 at this moment are detected by the angle displacement detector 41 and the moving amount displacement detector 241, respectively, and the thus-detected values are output to the CPU 51. The detected values having been output to the CPU 51 are stored in the RAM 52 as measurement data.

Since such measurement data is a value offset by a value of radius R of the sphere 31 of the probe 3 with respect to the actual outer shape value of the workpiece W, using measurement data stored in the RAM 52, a value of radius R is offset in the normal direction to obtain the actual value of the workpiece W. For details, since in the ROM 53, data of the XY coordinate of the center of the probe 3 in the initial stage is previously stored, using the XY coordinate of the center of the probe 3 at the initial stage, as well as the movement displacement amount of the X stage 24 and the angle displacement amount of the rotary stage 4 at each contact point detected by the moving amount displacement detector 41 and the angle displacement detector 241, the XY coordinate of the center of the probe 3 in the measuring position is calculated. Then, with respect to this calculated measurement data, a value of radius R in the contact position (equatorial position 34) of the probe 3 is offset. Via such measurement, outer circumferential shape data of a desired position of the workpiece W is obtained.

As described above, the shape measuring device 100 is provided with a probe 3, a probe support shaft 25, and a prove drive device 2. The probe 3 is a sphere 31 pivotally supported by the probe support shaft 25, having a cut face 32 which is a shape cut so as to be nearly vertical to the probe support shaft 25 in the sphere 31, whereby the probe 3 is used in such a manner that the cut face 32 is allowed to face a face (the upper face W2a of the cylinder W2) intersecting the outer circumferential face W1a containing the measuring position of a workpiece W and also the surface of the sphere 31 is allowed to make contact with the measuring position of the workpiece W. Namely, the cut face 32 makes it possible to prevent physical interference with the face (the upper face W2a of the cylinder W2) which results in interference in measurement. Thereby, highly precise measurement can be carried out.

Further, as compared in the conventional manner, to prevent physical interference with a face (the upper face W2a of the cylinder W2) which results in interference in measurement, the R of the sphere 31 needs not to be small and thereby a sphere 31 having larger size can be used. Thereby, the accuracy of rolling friction of the sphere 31 is increased and then a true sphere of further high precision can be produced. Still further, since the size of the sphere 31 can be increased, the attachment area with respect to the probe support shaft 25 can be increased and then the bonding power between the probe 3 and the probe support shaft 25 is enhanced, resulting in easy handling. Furthermore, since the probe support shaft 25 can be thickened, the probe support shaft 25 can be prevented from bending and then measurement error due to bending is prevented, whereby highly precise measurement can be carried out.

Further, the cut face 32 of the probe 3 is constituted in such a manner that distance M of the vertical direction between the cut face 32 and the top 33 of the sphere 31 opposed thereto across the equatorial plane 35 of the sphere 31 is at least radius R of the sphere 31, and of the surface of sphere 31, the equatorial position 34 of the sphere 31 is allowed to make contact with the measuring position of the outer circumferential face W1a of a workpiece W, leading to further highly precise measurement.

Still further, the probe drive device 2 is provided with an X stage 24, a Y stage 23, a rotary stage 4 to rotate a workpiece W, and a control device 5 to control the operation thereof Therefore, as the probe 3 is moved in the XY directions, the workpiece W is rotated and thereby the probe 3 can be accurately and assuredly brought into contact with the measuring position of the outer circumferential face W1a of the workpiece W. Thereby also in this respect, highly precise measurement can be carried out.

Second Embodiment

In a second embodiment, a device differing from the shape measuring device 100 of the first embodiment is employed in which a probe 3 can be moved in the Z direction with respect to a workpiece W and the inclination of a probe support shaft 25 can be adjusted.

Figure 6:
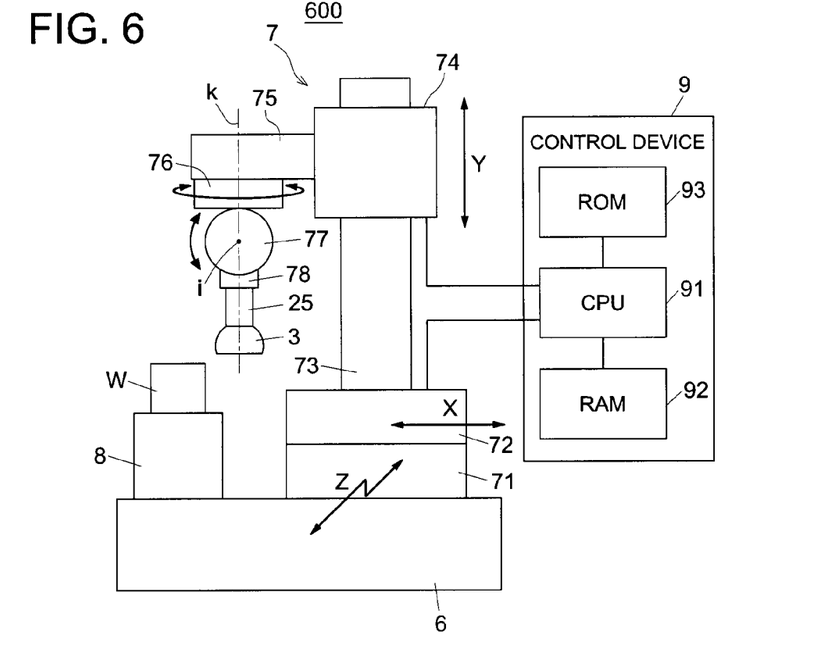
FIG. 6 is a conceptual view showing a schematic constitution of a shape measuring device in a second embodiment of the present invention.
Figure 8A:
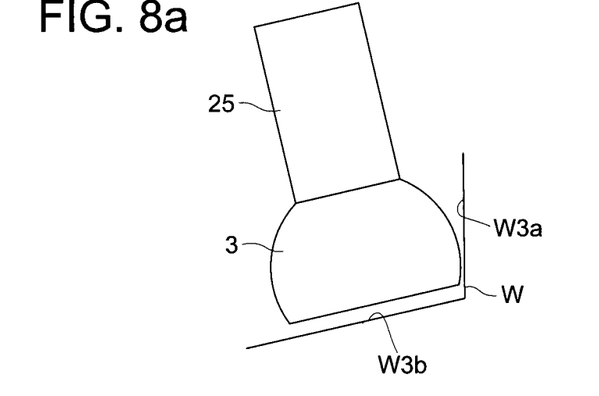
FIG. 8a is a view showing a shape measuring state of the surface of a workpiece in the second embodiment of the present invention.
Figure 8B:
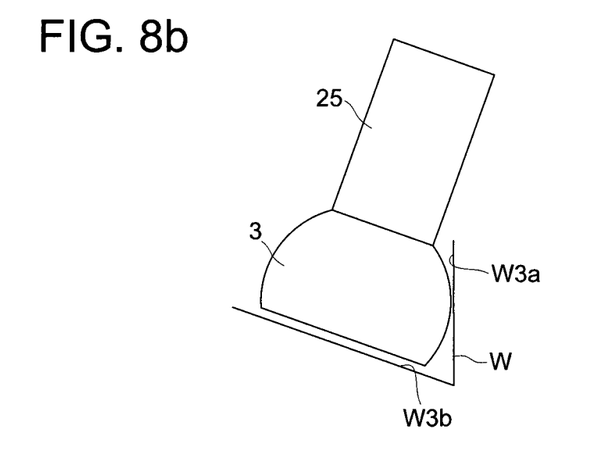
FIG. 8b is a view showing a shape measuring state of the surface of a workpiece in the second embodiment of the present invention.

As shown in FIG. 6, the shape measuring device 600 is provided with a probe 3, a probe support shaft 25 to pivotally support the probe 3, and a probe drive device 7, to which the probe support shaft 25 is attached, to allow the probe 3 to make contact with the measuring position of the outer circumferential face W3a (refer to FIG. 8) of a workpiece W and to move relatively the workpiece W and the probe 3.

The probe drive device 7 is provided with a base platform 6, a Z stage 71 provided on the base platform 6 moving in the Z direction (the Z direction vertical to the X direction and the Y direction), an X stage 72 provided on the Z stage 71 moving in the X direction, a Y axis guide 73 fixed on the X stage 72 extending in the Y direction, and a Y stage 74 supported by the Y axis guide 73 moving in the Y direction (the Y direction vertical to the X direction).

Further, the probe drive device 7 is provided with a rotary stage 76 attached to the Y stage 74 via an attachment member 75, a tilting stage 77 attached to the bottom face of the rotary stage 76, and a control device 9 to control the operation of the X stage 72, the Y stage 74, the Z stage 71, the rotary stage 76, and the tilting stage 77.

The rotary stage 76 rotates around the vertical axis k. The tilting stage 77 moves in an arc manner around the rotational center i arranged on the probe support shaft 25 to adjust the inclination of the probe 3. To the bottom face of the tilting stage 77, a contact displacement sensor 78 is attached.

The contact displacement sensor 78 detects a contact position when the probe 3 has made contact with the measuring position of a workpiece W and then outputs the contact position to the control device 9. To the bottom face of the contact displacement sensor 78, a probe support shaft 25 extending downward is attached, and further to the lower end of the probe support shaft 25, the probe 3 is attached.

Figure 7:
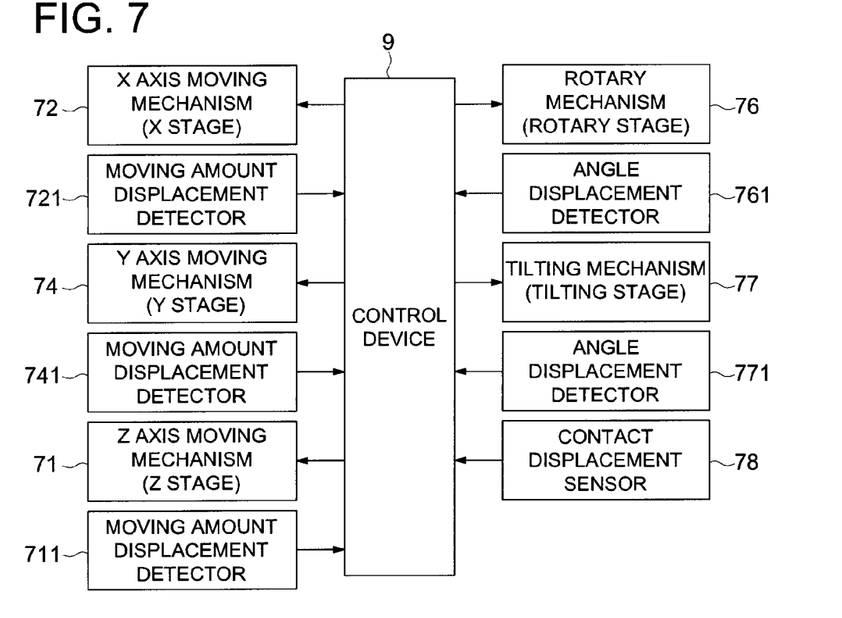
FIG. 7 a block diagram showing a schematic control constitution used in the second embodiment of the present invention.

As shown in FIG. 7, the X stage 72, the Y stage 74, and the Z stage 71 each have a moving amount displacement detectors 721, 741, 711 to detect each moving amount. These moving amount displacement detectors 721, 741, 711 are connected to the control device 9, and moving displacement amounts having been detected by the moving amount displacement detectors 721, 741, 711 are output to the control device 9.

The rotary stage 76 and the tilting stage 77 each have angle displacement detectors 761 and 771 to detect the angle displacement amounts of the rotary stage 76 and the tilting stage 77. The angle displacement detectors 761 and 771 are connected to the control device 9 to output angle displacement amounts having been detected by the angle displacement detectors 761 and 771.

As a probe 3, the same one as the probe 3 in the first embodiment is usable, which is a sphere 31 pivotally supported by the probe support shaft 25, having a cut face 32 which is a shape cut so as to be nearly vertical to the probe support shaft 25 in the sphere 31. Further, a workpiece W to be measured includes those in which, for example, as shown in FIG. 8, a face W3b intersecting the outer circumferential face W3a containing a measuring position is inclined against the outer circumferential face W3a.

On the support platform 8, a workpiece W to be measured is placed.

As shown in FIG. 7, the control device 9 is connected to an X stage 72, a Y stage 74, a Z stage 71, a rotary stage 76, a tilting stage 77, moving amount displacement detectors 721, 741, and 711, angle displacement detectors 761 and 771, and a contact displacement sensor 78. The control device 9 is provided with a CPU (Central Processing Unit) 91, a RAM (Random Access Memory) 92, and a ROM (Read Only Memory) 93 (refer to FIG. 6) to control the operation of the X stage 72, the Y stage 74, the Z stage 71, the rotary stage 76, and the tilting stage 77. In the control device 9, a program specified from various kinds of programs stored in the ROM 93 is developed on the RAM 92. Then, the thus-developed program cooperates with the CPU 91 to carry out various processings.

Next, a method to measure the shape of the outer circumferential face W3a of a workpiece W using the shape measuring device 600 will be described.

Initially, using numerical data of the shape of a workpiece W previously input in the ROM 93, the cut face 32 of a probe 3 is allowed to face a face W3b intersecting a face containing the measuring position of the outer circumferential face W3a of a workpiece W, and also in order for the equatorial position 34 of the probe 3 to make contact with the measuring position of the outer circumferential face W3a of the workpiece W, the X stage 72, the Y stage 74, the Z stage 71, the rotary stage 76, and the tilting stage 77 are moved. At this moment, for example, as shown in FIGS. 8A and 8B, the probe 3 is brought into contact so that the face W3b intersecting the outer circumferential face W3a containing the measuring position is avoided by the cut face 32 of the probe 3.

Contact position is detected by the contact displacement sensor 78, and at the position, the probe support shaft 25 is stopped. The angle displacement amounts of the rotary stage 76 and the tilting stage 77 at this moment each are detected by the angle displacement detectors 761 and 771, and at the same time, the displacement moving amounts of the X stage 72, the Y stage 74, and the Z stage 71 are detected by the moving amount displacement detectors 721, 741, and 711 to output the thus-detected values to the CPU 91.

The detected values having been output to the CPU 91 are stored in the RAM 92 as measurement data This operation is repeated to obtain measurement data of a desired position of the workpiece W.

Since such measurement data is a value offset by a value of radius R of the sphere 31 of the probe 3 with respect to the actual outer shape value of the workpiece W, using measurement data stored in the RAM 52, a value of radius R is offset in the normal direction to obtain the actual value of the workpiece W.

As described above, also in the second embodiment, in the same manner as in the first embodiment, a probe 3, a probe support shaft 25, and a probe drive device 7 are provided. The probe 3 is a sphere 31 pivotally supported by the probe support shaft 25 and has a cut face 32 which is a shape cut so as to be nearly vertical to the probe support shaft 25 in the sphere 31. Thereby, the same effects as in the first embodiment can be produced.

Further, especially, the prove drive device 7 in the second embodiment is provided with an X stage 72, a Y stage 74, a Z stage 71, a rotary stage 76, a tilting stage 77, and a control device 9. Thereby, when a probe 3 is moved in the XYZ directions and then rotation or inclination is adjusted, even a workpiece W having a complex shape and a face resulting in interference in measurement can be easily allowed to correspond to the measuring position. As a result, the probe 3 is assuredly brought into contact and thereby further highly precise measurement can be carried out.

The present invention is not limited to the above embodiments and can be appropriately modified without departing from the gist of the present invention.

Figure 9:
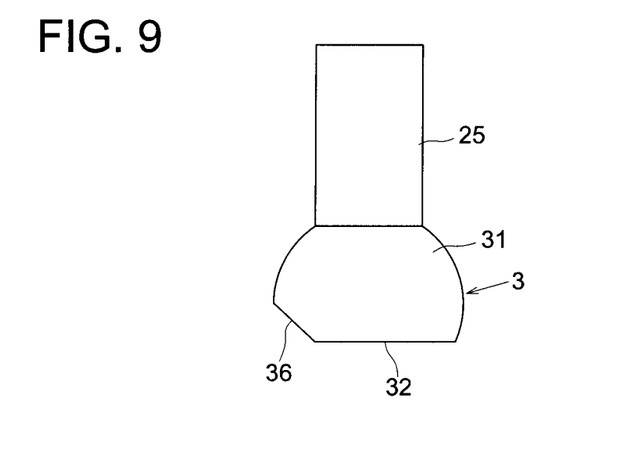
FIG. 9 shows the shape of a probe as a modified example.

For example, as shown in FIG. 9, the probe 3 may be provided with a cut face for interference 36 formed by cutting a part except the cut face 32 of the surface of sphere 31. When such a cut face for interference 36 is provided, in addition to the faces W2a and W3a resulting in interference in measurement, another face resulting in interference can be avoided. Thereby, smooth and highly precise measurement can be carried out. Further, such a cut face for interference 36 may be plurally provided depending to the shape of a workpiece W.

Further, as the workpieces W used in the above embodiments, those shown in FIG. 1 and FIG. 8 have been cited with no limitation thereto. A workpiece W having a curved surface is employable and modifications can be appropriately made.

DESCRIPTION OF THE SYMBOLS

2: probe drive device
3: probe 5, 9: control device
23, 74: Y stage (Y axis moving mechanism)
24, 72: X stage (X axis moving mechanism)
25: probe support shaft
31: sphere
32: cut face
33: top
34: equatorial position
35: equatorial plane
36: cut face for interference
76: rotary stage (rotary mechanism)
77: tilting stage (tilting mechanism)
71: Z stage (Z axis moving mechanism)
100, 600: shape measuring device
W: workpiece
M, N: distance

What is claimed is:

1. A shape measuring device to measure a surface shape of a workpiece based on a moving amount of a probe by contacting or moving the probe while in contact with a surface of the workpiece, wherein the shape measuring device comprises:
   the probe;
   a probe support shaft to pivotally support the probe; and
   a probe drive device to which the probe support shaft is attached to contact the probe with a measuring position of the surface of the workpiece and to move relatively the workpiece and the probe;
   wherein the probe is a sphere pivotally supported by the probe support shaft and has a cut face which is a shape cut so as to be nearly vertical to the probe support shaft in the sphere; and
   a shape measurement of the surface of the workpiece is carried out in such a manner that the cut face of the probe is faced with a face intersecting a face containing the measuring position of the surface of the workpiece, and a surface of the sphere is contacted with the measuring position of the workpiece.

2. The shape measuring device of claim 1,
   wherein a distance of the vertical direction between the cut face and the top of the sphere opposed thereto across a plane of an equator of the sphere is at least radius R of the sphere; and
   a position of the equator of the surface of the sphere is made contact with the measuring position of the workpiece.

3. The shape measuring device of claim 2,
   wherein a distance of the direction nearly vertical to the cut face between a position which contacted a position of the equator of the sphere for the measuring position of the workpiece and the cut face is 0 μm-60 μm.

4. The shape measuring device of the claim 1,
   wherein the probe further comprises at least one of a cut face for interference formed by cutting a part of the sphere except the cut face of the sphere.

5. The shape measuring device of the claim 1,
   wherein the probe drive device further comprises:
   a X-axis move section to move the probe in a direction of X to the workpiece;
   a Y-axis move section to move the probe in a direction of Y which is vertical to the direction of X to the workpiece;
   a rotary section supporting the workpiece and rotating the workpiece centering on a rotation axis passing through nearly center of the workpiece; and
   a control device to control start and stop of the X-axis move section, the Y-axis move section, and the rotary section so as to contacts the probe to a measuring position of the workpiece.

6. The shape measuring device of the claim 1,
   wherein the probe drive device further comprises:
   a X-axis move section to move the probe in a direction of X to the workpiece;
   a Y-axis move section to move the probe in a direction of Y which is vertical to the direction of X to the workpiece;
   a Z-axis move section move the probe in a direction of Z which is vertical to the direction of X and the direction of Y to the workpiece;
   a rotary section to rotate the probe centering on the probe support shaft;
   a tilting section adjusting an inclination of the probe; and
   a control device control start and stop of the X-axis move section, the Y-axis move section, Z-axis move section, the rotary section and the tilting section so as to contact the probe to a measuring position of the workpiece.

* * * * *